United States Patent [19]

Schmidt

[11] 4,143,624
[45] Mar. 13, 1979

[54] SPARK-IGNITED RECIPROCATING-PISTON INTERNAL COMBUSTION ENGINE

[75] Inventor: Karl-Walter Schmidt, Weinstadt, Fed. Rep. of Germany

[73] Assignee: Daimler-Benz Aktiengesellschaft, Fed. Rep. of Germany

[21] Appl. No.: 751,716

[22] Filed: Dec. 17, 1976

[30] Foreign Application Priority Data

Dec. 17, 1975 [DE] Fed. Rep. of Germany ....... 2556720

[51] Int. Cl.$^2$ ............................ F02B 23/08; F02F 3/28
[52] U.S. Cl. ............................ 123/32 B; 123/193 CP; 123/193 CH; 123/193 P
[58] Field of Search ........... 123/32 B, 193 R, 193 CP, 123/193 CH, 193 H, 193 P, 65 S, 59 BS

[56] References Cited

U.S. PATENT DOCUMENTS

| | | | |
|---|---|---|---|
| 1,008,188 | 11/1911 | Newcomb | 123/32 B |
| 2,735,416 | 2/1956 | Ferguson et al. | 123/193 R |
| 2,766,739 | 10/1956 | Kosche | 123/32 B |
| 3,923,015 | 12/1975 | Mukai et al. | 123/32 B |
| 4,000,722 | 1/1977 | May | 123/32 B |
| 4,011,841 | 3/1977 | Sato et al. | 123/32 B |
| 4,026,250 | 5/1977 | Funiciello | 123/193 CP |
| 4,052,972 | 10/1977 | Mizunuma et al. | 123/193 H |
| 4,070,999 | 1/1978 | Matsuno | 123/59 BS |

FOREIGN PATENT DOCUMENTS

| | | | |
|---|---|---|---|
| 2303947 | 10/1976 | France | 123/193 CP |
| 668320 | 3/1952 | United Kingdom | 123/193 R |

Primary Examiner—Ronald H. Lazarus
Assistant Examiner—Craig R. Feinberg
Attorney, Agent, or Firm—Craig & Antonelli

[57] ABSTRACT

A spark-ignited reciprocating-piston internal combustion engine is provided with a combustion chamber subdivided in the top dead center zone into two chambers. These two chambers are separated from one another by overlapping parts of the piston and cylinder and cylinder head when in the top dead center zone, such that when in this position a cross-connection between the chambers exist only at one position along the circumference of the piston. An ignition source is provided adjacent one circumferential end of a first of the chambers which forms a combustion duct between the ignition source and the cross connection. The ignition is controlled so as to take place only after the piston and cylinder are in respective positions separating the combustion chamber into the two chambers.

10 Claims, 4 Drawing Figures

SPARK-IGNITED RECIPROCATING-PISTON INTERNAL COMBUSTION ENGINE

BACKGROUND AND SUMMARY OF THE INVENTION

This invention relates to a spark-ignited reciprocating-piston internal combustion engine with a combustion chamber subdivided in the top dead center zone (with piston in top dead center position) into two chambers, between which a cross connection exists in the region of the piston rim, one of these chambers being associated with the source of ignition and forming a combustion duct between the source of ignition and the cross connection.

In a conventional construction of this type, such a design with two chambers is to prevent the efflux of uncombusted gases in the overlapping range of the opening times of inlet and outlet elements and, simultaneously, combustion dead times are also to be avoided. In summation, these measures are to serve for reducing the content of pollutants in the exhaust gases of such internal combustion engines (DOS [German Unexamined Laid-Open Application] No. 2,455,960).

In contrast thereto, the invention is based on the object of affecting the heating principle, i.e. the combustion characteristic, of such internal combustion engines so that a low proportion of nitrogen oxides is obtained and, by accelerating the combustion, a low specific fuel consumption is achieved.

According to the invention, this can be accomplished in a spark-ignited reciprocating-piston internal combustion engine of the aforementioned type by providing that the ignition takes place only after separation of the compression volume into the two chambers (ignition only after piston and cylinder are in relative positions forming two chambers).

To separate the compression volume into the two chambers, it is contemplated within the scope of this invention to provide mutually opposed bridges or lands on the piston and cylinder sides, which lands overlap in the dead center zone with the formation of a gap therebetween.

According to another preferred embodiment of this invention, for separating the two chambers, a combustion duct is associated with the cylinder, which duct adjoins the piston periphery so that it can be passed over by the piston, i.e. it can essentially also be segregated from the second chamber.

The separation of the two chambers prior to ignition and the formation of a combustion duct by means of one of these chambers offers the possibility, as has been demonstrated by experiments, of affecting the combustion rate in the direction toward a desired combustion characteristic, namely by fashioning the cross-sectional extension of the combustion duct from the spark plug vertically to the direction of movement of the flame front approximately in proportion to the predetermined combustion characteristic, wherein a reduction in the cross section results in an increase in the combustion rate. This possibility of influencing the combustion characteristic forms the prerequisite for being able to operate at a high compression $\epsilon$ without the occurrence of spontaneous ignitions, since the maximum pressure $p_{max}$ in the combustion chamber can be correspondingly controlled by the aforementioned design of the cross section. Thus, no spontaneous ignitions of unconsumed mixture proportions take place during the progression of the combustion. The high compression ratio $\epsilon$ also leads to a low fuel consumption, and the limitation of the peak pressure reduces the combustion noise, so that, as seen in total, spontaneous ignitions can be avoided in spite of a high compression and a smooth combustion process can be achieved.

The influence on the peak pressure and the possibility of limiting same also provides the capability of lowering the temperatures so that the formation of nitrogen oxides is extensively avoided.

On the other hand, the possibility of operating at a high compression ratio while yet maintaining the aforementioned advantages leads to the feature that a relatively lean mixture can be utilized without the danger of ignition failures or misfirings, whereby the proportion of carbon monoxide in the exhaust gases can be reduced.

Finally, the deflection or guidance of the combustion process also has the effect that the flame front as such remains preserved for a longer period of time than in conventional internal combustion engines, whereby also those mixture proportions are utilized which exit from the gap spaces upon a pressure drop and whereby the proportion of hydrocarbons in the exhaust gases can be maintained at a minor value.

Above and beyond the above-mentioned advantages, the solution of this invention of subdividing the system into two combustion chambers also offers the advantage that a layering of the mixed charge can be attained in a simple manner without having to provide a separate chamber, so that the disadvantages occurring in conventional engines operating with separate chambers and a layered charge—namely a lack in the flushing of the chamber—are avoided.

A particularly simple construction, which additionally provides a layering feature in an advantageous manner, can be obtained especially in those embodiments wherein the combustion chamber, in association with the cylinder, is arranged adjoining to the piston circumference and can be passed over by the piston. In this connection, the combustion duct is preferably disposed in the transition between the cylinder head and the cylinder block. The combustion duct is preferably arranged so that it is first of all passed through by the mixture exiting from the inlet valve. The fuel particles then are deposited in the sack-like combustion duct and thereby enrich the mixture in the spark plug zone.

The combustion duct can also be disposed in the cylinder skirt according to other preferred embodiments, and in those solutions wherein the combustion duct is associated with the cylinder, it is advantageous to have the combustion duct extend approximately over half the piston and/or cylinder circumference.

The combustion duct associated with the cylinder can be overriden (overtraveled) in a simple manner by a piston part fashioned with an excessive height, which covers the combustion duct containing the source of ignition except for the end zone located away from the source of ignition. This end zone of the combustion duct terminates at a piston zone located at a lower level which, in a top view on the piston, can be fashioned as a crescent-shaped indentation.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
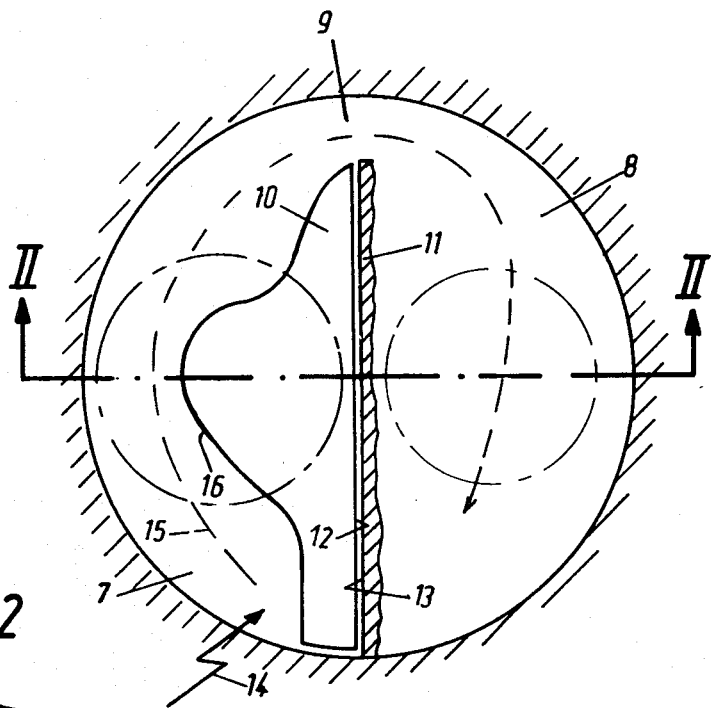
FIG. 1 is a sectional schematic view along line I—I of FIG. 2 through part of a reciprocating-piston internal combustion engine constructed in accordance with a preferred embodiment of the invention.
Figure 2:
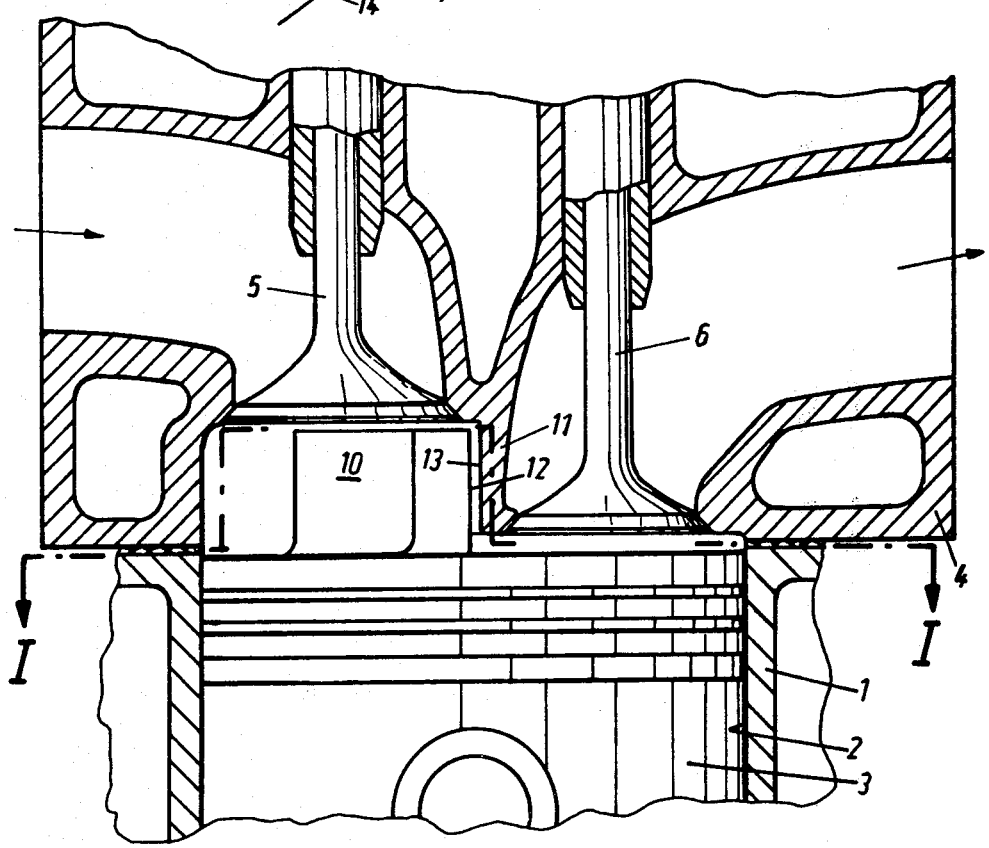
FIG. 2 is a sectional view along line II—II of FIG. 1.

FIGS. 1 and 2 show, in schematic views, the cylinder head zone of a cylinder of a reciprocating-piston internal combustion engine wherein 1 denotes the cylinder block of a cylinder, a piston 3 being disposed in the bore 2 thereof, the cylinder block being covered at the top by the cylinder head 4. In the head 4, an inlet valve 5 and an outlet valve 6 are arranged.

As can be seen from the illustrations of FIGS. 1 and 2, the combustion chamber of the illustrated cylinder is subdivided, in the illustrated top dead center zone of the piston 3, into two chambers 7, 8, between which a cross connection 9 is provided in the region of the piston rim. Starting with the cross connection 9, the two combustion chambers 7, 8 each extend over half the piston circumference and are separated from each other by parts 10 of the piston 3 and 11 of the cylinder head 4, these parts overlapping in this top dead center zone. The part 10 provided at the piston is represented by a raised portion emanating from the piston top with a vertical wall 12 dropping in the axial direction of the piston. The part 11 on the cylinder head side is produced by a step receding in the cylinder head with a limiting wall 13 extending in the axial direction of the cylinder and facing the wall 12 of the raised portion 10. The walls 12 and 13 form a gap space extending up to the cross connection 9 almost over the entire width of the piston and separating the two chambers 7 and 8 so that a transgression of the flame front in the top dead center zone is possible only by way of the cross connection 9. Thereby, starting with the ignition source 14 provided at the end of chamber 7 facing away from the cross connection 9, a propagation of the flame fronts is obtained over the chamber 7, fashioned as the combustion duct, and the cross connection 9 into the chamber 8. The speed of progression of the combustion, i.e. the advancement of the flame fronts along the path indicated in the drawing by the dashed line 15, can be determined, on the one hand, by the cross section of the combustion duct 7 vertically to the traveling direction of the flame front, the traveling speed becoming the higher, the smaller the respective cross section. On the other hand, the design of the cross section of chamber 8 also has an influence on the speed with which the combustion proceeds; the cross section can be varied, for example, by indentations or protruberances at the piston. Therefore, by means of the respective cross-sectional dimensioning, an effect can be exerted on the progression of the combustion and thus on the heating principle.

Corresponding cross-sectional variations are obtained, in the embodiment, by the configuration of the wall 16 of the raised portion 10 of the piston, wherein the wall 16, in the embodiment, likewise extends in the direction of the piston axis and constitutes the limitation for the raised portion 10 in opposition to the wall 12.

Figure 3:
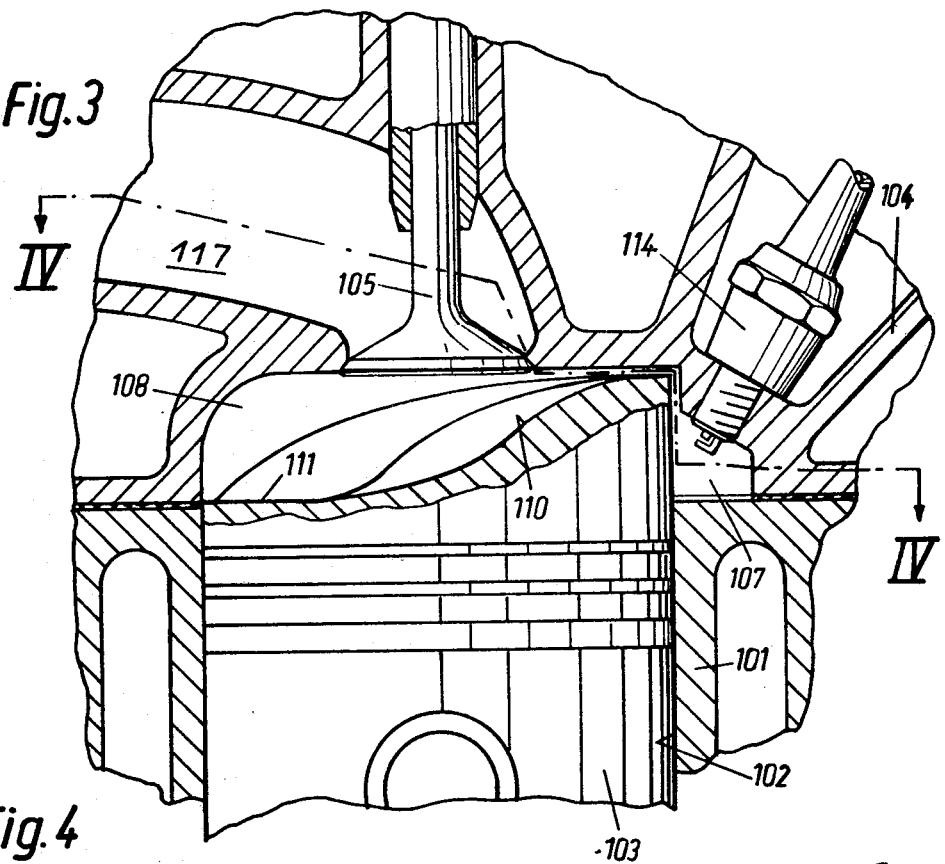
FIG. 3 is a sectional schematic view along line III—III of FIG. 4 through part of another embodiment of a reciprocating-piston internal combustion engine according to this invention.
Figure 4:
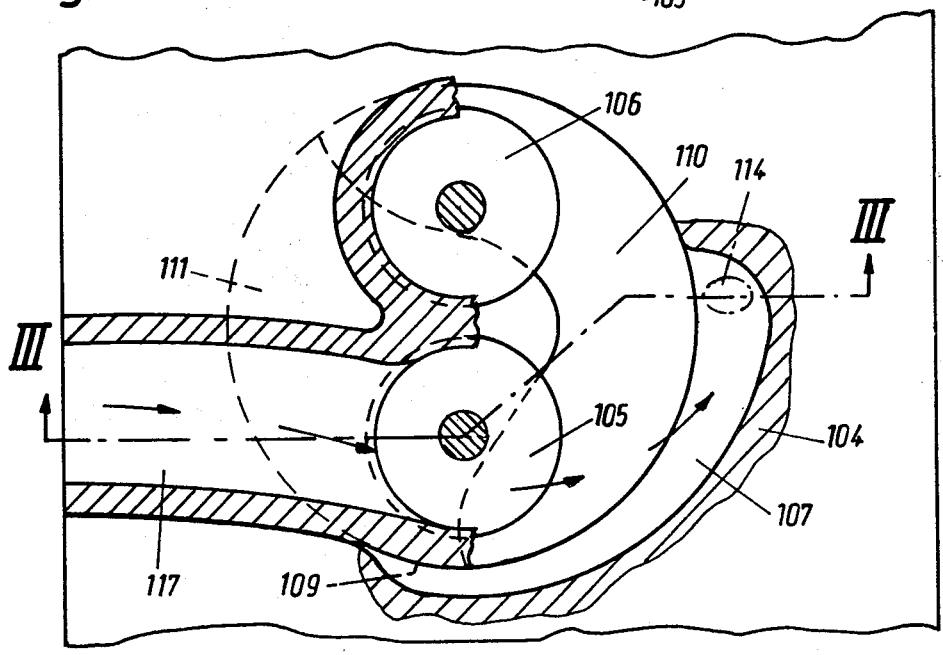
FIG. 4 is a sectional view along line IV—IV through the internal combustion engine according to FIG. 3.

FIGS. 3 and 4 also show a schematic view of the cylinder head zone of a cylinder pertaining to a reciprocating-piston internal combustion engine. In this embodiment, the cylinder block is denoted by 101, the cylinder bore by 102, and the piston by 103. The cylinder head 104 is placed on the block 101, the inlet valve 105 and the outlet valve 106 being disposed in this cylinder head. The combustion chamber of the engine comprises, in the illustrated top dead center position, again two chambers 107, 108 which, in this top dead center position, are in communication only by way of the cross connection 109. The chamber 108 is separated from the piston 103 with respect to the cylinder head and lying above the piston, whereas the chamber 107 is provided in the junction zone between the cylinder block 101 and the cylinder head 104 and is overriden, up to the cross connection 109, by way of the piston 103, based on the position of the latter in the top dead center zone.

The overriding is effected by providing the piston, except for the zone of the cross connection 109, at least over the peripheral region over which chamber 107 extends, with a raised bottom portion 110 which is higher, as compared to the bottom portion 111 at least by the value corresponding to the axial height of the chamber 107. The raised portion 110 extends, in the illustrated embodiment, approximately in a crescent shape over the piston region facing the chamber 107, so that the part 111 represents itself, in opposition thereto, as an indentation in the piston open at the rim. The chamber 107 terminates toward this indentation open at the rim, the source of ignition 114 being arranged at the end of chamber 107 facing away from the cross connection 109.

The valves 105 and 106 are disposed above the piston 103, the inlet valve 105 with the associated inlet duct 117 being arranged so that the entering fresh gases flow preferably about tangentially in the direction toward the ignition source 114 into the chamber 107. In the latter, an enrichment of the mixture by fuel depositing is achieved, due to the pocket-like configuration, in the end zone associated with the ignition source 114 and being approximately in opposition to the inlet duct with reference to the cylinder axis, with the consequence of a certain charge layering.

The arrangement of the chamber 107 radially outside of the piston makes it possible to effect an advantageous overriding of this chamber and thus to form a flushed secondary chamber without separate control valves.

Also in this embodiment, the cross section in chamber 107 can be varied with a view toward affecting the combustion process, i.e., with respect to the propagation rate of the flame fronts, so that the advantageous operations result which have been described above.

While I have shown and described several embodiments in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Spark-ignited reciprocating-piston internal combustion engine with a combustion chamber subdivided in the top dead center zone into a first and second chamber located at respective opposite sides of the piston, between which the first and second chambers a cross connection exits extending along a curved path adjacent the periphery of the piston rim, the first chamber being associated with a source of ignition and forming a combustion duct between the source of ignition and the cross connection, wherein means are provided for assuring that initiation of ignition at said source of ignition takes place only after the piston and cylinder are in respective positions separating the combustion chamber into the two chambers whereby propagation of the flame front is assured from a position adjacent the source of ignition in the first chamber through the cross connection and into the second chamber.

2. Spark-ignited reciprocating-piston internal combustion engine according to claim 1, wherein mutually opposed parts on the piston side and on the cylinder head side are provided which overlap, with the formation of a gap, in the dead center zone to form a separation of the two chambers.

3. Spark-ignited reciprocating-piston internal combustion engine according to claim 1, wherein the chamber forming the combustion duct associated with the cylinder extends approximately over half the cylinder circumference.

4. Spark-ignited reciprocating-piston internal combustion engine according to claim 3, wherein the combustion duct associated with the cylinder is overlapped by a raised piston part and is covered during this step except for a cross connection provided in the end zone of the combustion duct facing away from the ignition source.

5. Spark-ignited reciprocating-piston internal combustion engine according to claim 4, wherein the combustion duct associated with the cylinder is associated in its position with an inlet duct so that the stream of the entering fuel-air mixture is oriented toward this combustion duct.

6. Spark-ignited reciprocating-piston internal combustion engine according to claim 1, wherein the chamber forming the combustion duct is provided adjacent to the piston circumference and is overlapped in the direction of piston travel by the piston when the piston is in the top dead center zone.

7. Spark-ignited reciprocating-piston internal combustion engine according to claim 6, wherein the combustion duct associated with the cylinder is overlapped by a raised piston part and is covered during this step except for a cross connection provided in the end zone of the combustion duct facing away from the ignition source.

8. Spark-ignited reciprocating-piston internal combustion engine according to claim 6, wherein the combustion duct associated with the cylinder is associated in its position with an inlet duct so that the stream of the entering fuel-air mixture is oriented toward this combustion duct.

9. Spark-ignited reciprocating-piston internal combustion engine according to claim 3, wherein the combustion duct is provided in a transition space between the cylinder head and the cylinder block.

10. Spark-ignited reciprocating-piston internal combustion engine according to claim 9, wherein the chamber forming the combustion duct associated with the cylinder extends approximately over half the cylinder circumference.

* * * * *